United States Patent [19]

Smalley et al.

[11] Patent Number: 5,046,602

[45] Date of Patent: Sep. 10, 1991

[54] INERTIAL CONVEYOR SYSTEM

[75] Inventors: Alfred E. Smalley, Knox County; Joseph C. Gundlach, Anderson County, both of Tenn.

[73] Assignees: Smalley Mfg. Co., Knoxville; Acraloc Corp., Oak Ridge, both of Tenn.

[21] Appl. No.: 470,844

[22] Filed: Jan. 25, 1990

[51] Int. Cl.$^5$ .............................................. B65G 27/00
[52] U.S. Cl. .................................... 198/750; 198/766
[58] Field of Search ....................... 198/750, 752, 766; 414/750

[56] References Cited

U.S. PATENT DOCUMENTS

| | | | |
|---|---|---|---|
| 3,476,234 | 11/1969 | Allen et al. | 198/766 X |
| 3,817,370 | 6/1974 | Cox | 198/766 X |
| 3,910,422 | 10/1975 | Zierpka | 198/750 X |
| 4,019,626 | 4/1977 | Kamner | 198/750 |
| 4,436,199 | 3/1984 | Baba et al. | 198/750 |
| 4,567,979 | 2/1986 | Hoehn | 198/750 |

*Primary Examiner*—Joseph E. Valenza
*Assistant Examiner*—Keith L. Dixon
*Attorney, Agent, or Firm*—Pitts and Brittian

[57] ABSTRACT

An inertial-type conveyor system for the moving of articles from one position to another, the system having minimal detrimental vibrations. During a forward stroke of a tray of the system, the tray moves at an acceleration less than that required to overcome the frictional contact between the articles and the tray. Then during a return stroke, of an equal distance, the tray moves at an acceleration sufficiently greater such that the articles continue to move by inertia while the tray is moving backward. In the preferred embodiment, the system is provided with a counterweight mechanism having a counterweight that moves in an opposite direction to the direction of motion of the tray to offset the reaction force produced by the moving tray. Elimination of undesirable vibrations is achieved through the use of the counterweight and by having the tray and counterweight to be substantially the same mass and have substantially the same center of gravity. In the preferred embodiment, the simultaneous movement of the tray and counterweight is achieved by cam followers in contact with cam surfaces of selected contours on a single rotatable cam member. Typical operating conditions are given.

20 Claims, 5 Drawing Sheets

INERTIAL CONVEYOR SYSTEM

DESCRIPTION

1. Field of the Invention

This invention relates generally to systems for the transport of articles via a conveyor, and more particularly to a transport conveyor system utilizing the inertia of the articles themselves for movement along the conveyor to a destination point, the conveyor system having provision for minimizing vibration.

2. Background Art

Conveyors systems are utilized in many industries, typically including the manufacturing and packaging industries. These conveyor systems can be of many types, such as continuous belt conveyors, shaker (inertial) conveyors, etc. Often the articles being transported must be deposited upon further conveyor units as in the case of a change in direction of the transfer. In the case of the continuous belt type conveyor, when articles are to be deposited upon another belt there is often a drop of several inches due to the size of the rollers/wheels that carry the belt. For some types of articles that are fragile, such as foodstuffs, this drop is detrimental. In the case of the shaker- or inertial-type conveyors, very little drop distance can be provided such that there is no damage to the articles being transferred. Also, the tray in this latter type of conveyor can be made o materials that will not be damaged by the material being transferred and, more importantly, will not contaminate the materials being transferred.

A problem that has been encountered in the prior art is the matter of the vibration that often occurs with the devices for inertial-type conveyors. The principle of these conveyors is to cause vibration of the transfer tray such that during a "forward" stroke, the articles are moved with the tray. Then, during the "return" stroke, the inertia of the articles causes them to remain in motion slipping along the tray as the tray is returned. To accomplish this, the tray oscillation is produced by a wide number of mechanisms. Some of these create substantial vibration such that the machine must be firmly attached to a support surface.

A number of mechanisms have been devised to produce the tray oscillation and, in some of the designs, to minimize the vibration. Typically of these prior art devices are those shown and described in U.S. Pat. Nos. 218,757 issued to F. Martin, Jr. on Aug. 19, 1879; 1,843,282 issued to E. Horn et al on Feb. 2, 1932; 3,212,630 issued to K. M. Allen et al on Oct. 19, 1965; 4,019,626 issued to H. J. Kamner on Apr. 26, 1977; and 4,339,029 issued to D. A. Wilson On July 13, 1982.

All of these known systems must be designed for the transport of a specific article on the conveyor, with the exception of those described in the '626 and '019 patents which can be modified for specific products. However, even with the effort to minimize vibration, each of these devices does produce undesirable vibration (and thus noise) during operation. Further, some of these systems will damage fragile items being transported on the tray thereof. While these patents describe the principles of inertial conveyance, several are constructed without an understanding of these principles.

Accordingly, it is an object of the present invention to provide an inertial-type convey system that substantially eliminates vibration effects of the operating mechanism.

Another object of the present invention is to provide means for offsetting a reaction force produced by the acceleration of the conveyor tray to thereby eliminate vibrational effects.

It is another object of the present invention to provide an inertial conveyor system utilizing a counterbalance (counterweight) to offset the reaction force produced by the moving of the conveyor tray so as to substantially eliminate vibration effects of the operating mechanism.

It is also an object of the present invention to provide a conveyor system using a counterweight to overcome vibration where the weight of the counterweight is substantially equal to the weight of the conveyor tray.

A further object of the present invention is to provide an inertial conveyor system wherein the center of mass of the counterweight is matched to the center of mass of the conveyor tray along a common line of action in order to substantially eliminate vibration of the system.

These and other objects of the present invention will become apparent upon a consideration of the drawings which are referenced below and a complete description thereof.

SUMMARY OF INVENTION

In accordance with the present invention, there is provided in the preferred embodiment an inertial conveyor system wherein a plurality of rotatable cam surfaces and cam followers provide simultaneous reciprocating movement of a conveyor tray and a counterweight means, with the counterweight means moving in a direction opposite the movement of the conveyor tray. The conveyor tray and the counterweight means are constructed such that they have substantially the same weight and that the center of mass of the tray mechanism and that of the counterweight means move along lines of action at the same location. By this construction, the various forces are limited to the oscillatory movement without attendant undesirable vibrations. Typically the cams are contoured so as to provide a forward stroke for 270° and a return stroke for 90°. The system can be utilized to move articles in either of the two possible directions.

DETAILED DESCRIPTION OF THE INVENTION

Figure 1:
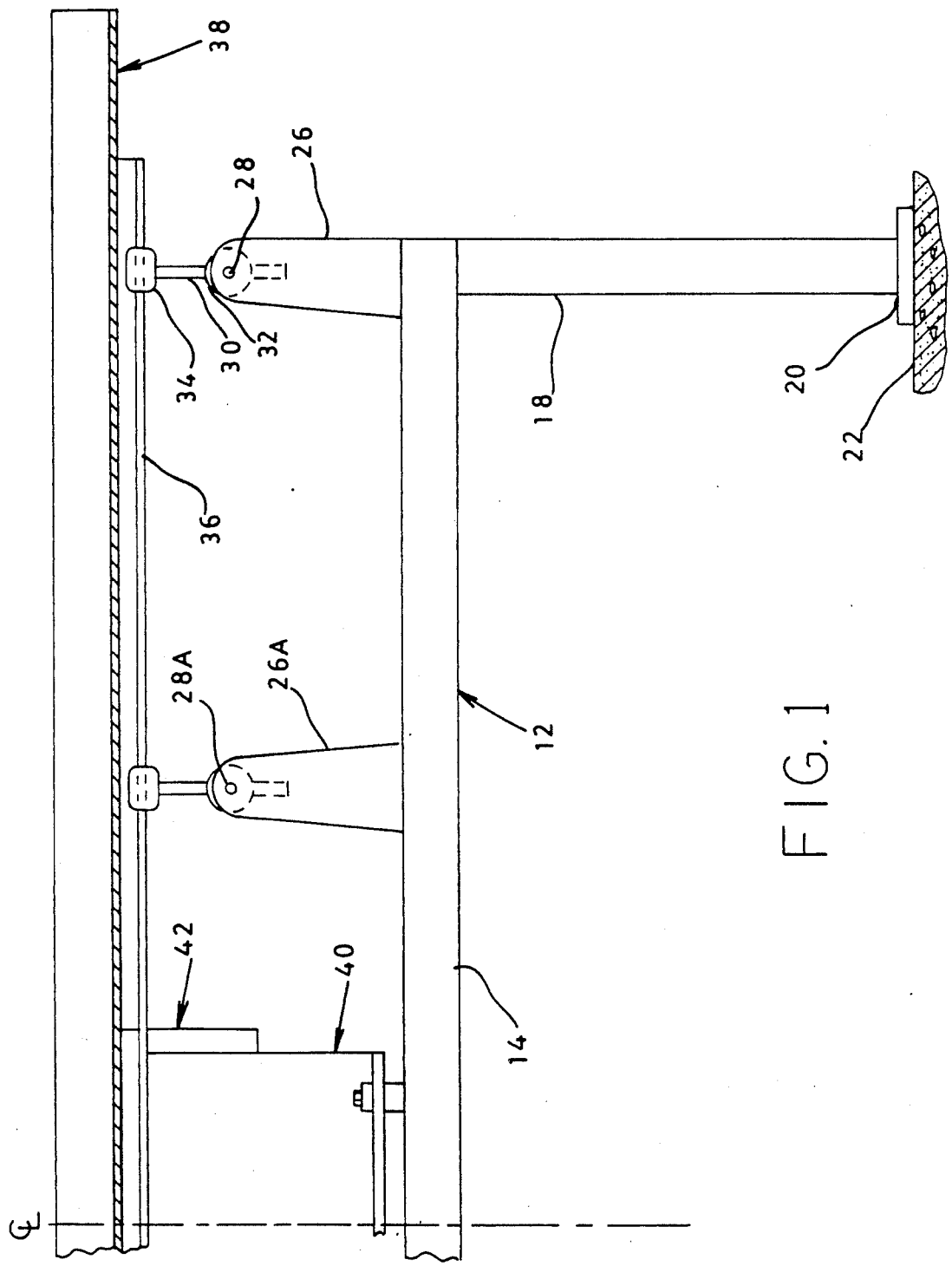
FIG. 1 is a side elevation of a general conveyor system that incorporates the features of the present invention, this drawing illustrating approximately one-half of the system.
Figure 2:
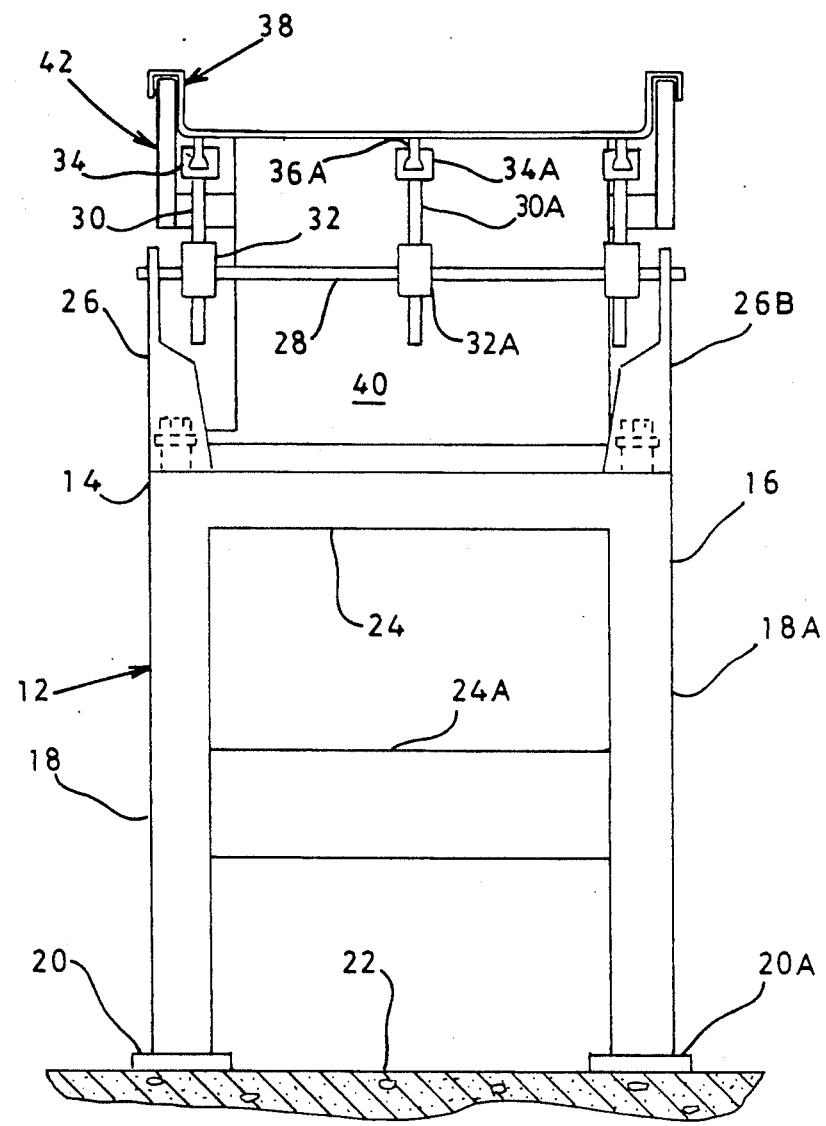
FIG. 2 is an end elevation of the general conveyor system of FIG. 1.

Referring first to FIGS. 1 and 2, shown therein is the general form of the inertial conveyor system of the present invention. It has a frame 12 which typically has a pair of side supports 14, 16 extending substantially the length of the device, with a plurality of upright legs 18, 18A, etc. that terminate in plate-like feet 20, 20A, etc. to provide adequate support upon a surface 22. If desired, these feet can be attached to the support surface. Appropriate cross-braces 24, 24A, etc. are typically used. It will be understood, however, that the shape and overall construction of the frame 12 can be changed without departing from the scope of the present invention.

A plurality of upright supports 26, 26A, etc. are fixedly attached to the top edge of the side supports 14, 16. These upright supports typically support bars 28, 28A, etc. passing across the frame 12, with upright leveling arms 30, 30A, etc. adjustably mounted from the support bars using coupling means 32, 32A, etc. Guide members 34, 34A, etc. are typically attached to the upper ends of these leveling arms, with these guide members engaging slideways 36, 36A, etc. attached to (or forming part of) the bottom of a conveyor pan 38. Also attached to the top edge of the side supports 14, 16 is an enclosure 40 for the operating components utilized to create the reciprocating motion of the conveyor pan 38, as well as the reciprocating motion of counterweight means 42. As is the case of the components of the frame 12, the other general tray support components discussed are not considered unique relative to the present invention except for the details given hereinafter with regard to the content of the enclosure 40 and the counterweight means 42.

Figure 3:
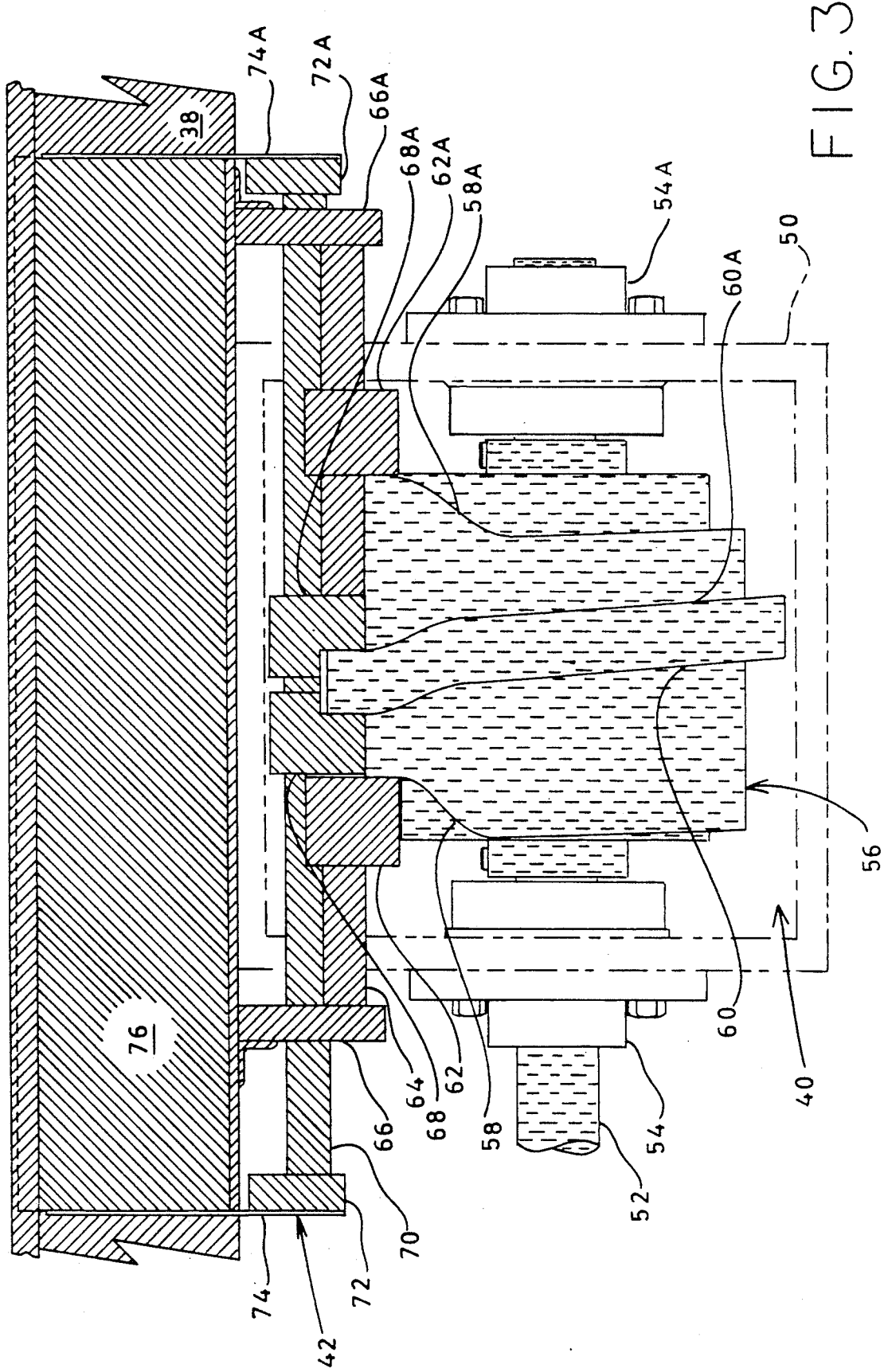
FIG. 3 is a side elevation of the drive mechanism as utilized in the general conveyor system of FIG. 1 to substantially eliminate vibration, and showing the relationship of this drive mechanism to the tray of the conveyor system. In this FIG. 3 and FIG. 4, surfaces are shaded using color symbols to distinguish between the components that produce movement of the conveyor tray, the components that move the counterweight, and the components that relate to both movements.
Figure 4:
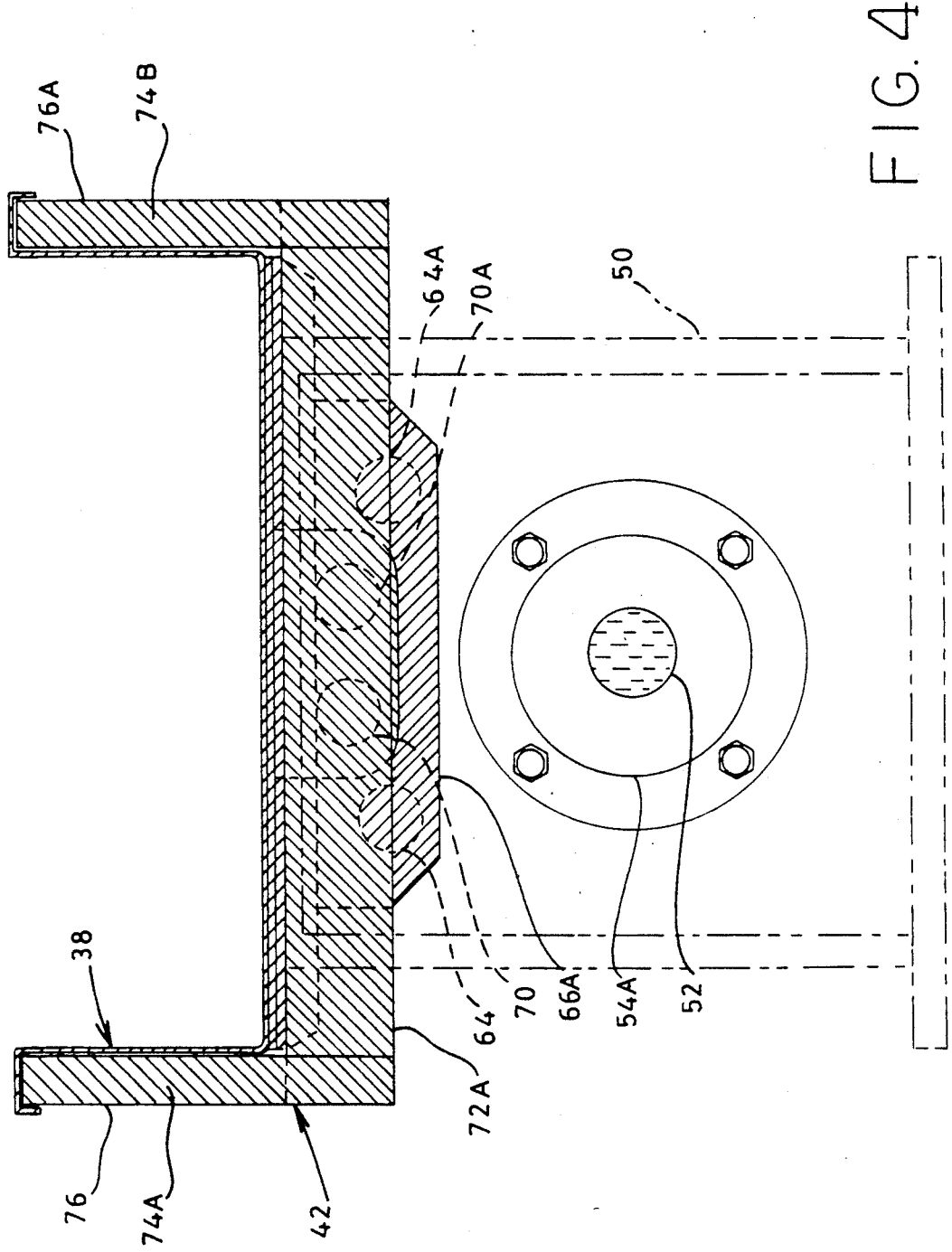
FIG. 4 is an end elevation of the apparatus shown in FIG. 3.

Referring now to FIGS. 3 and 4, shown therein are the components used in accordance to the present invention to achieve oscillatory axial movement of a conveyor tray or pan 38 and counterweight means 42, the counterweight means being a preferred form of means to offset a reaction force produced by the moving tray 38. In order to distinguish the various components as related to the movement of the tray and counterweight, surface shading is used in these figures in the form of symbols for colors. Components associated with only tray movement are shaded as green, components associated with only counterweight movement are shaded as brown, and components associated with both movements are shaded as violet or purple.

This mechanism 40 is housed in an enclosure 50, primarily so that adequate lubrication can be provided. A shaft 52, driven by any suitable rotating means, traverses this enclosure where it is journalled in bearing-/seal units 54, 54A. A cam member 56 is attached to this shaft within the enclosure. This cam member 56 typically is fabricated from nylon or has a nylon outer surface so as to reduce friction. Of course, other suitable materials can be used. The cam member has cam surfaces 58, 58A at opposite ends, with these surfaces being uniformly spaced apart. In addition, a second pair of cam surfaces 60, 60A are provided on the periphery of the cam member, with these surfaces also being uniformly spaced apart. The particular contour of these cam surfaces 58, 58A, 60, 60A will be discussed in detail hereinafter.

In the particular embodiment illustrated in FIG. 3, the cam surfaces 58, 58A are utilized to drive the pan or tray 38 of the conveyor. Accordingly, cam followers 62, 62A are mounted on a reciprocatable shaft 64 (a second set of followers and shaft are also used, see FIG. 4) that passes through appropriately-bushed openings in the enclosure 50. Opposite ends of this shaft 64 are attached to pan supports 66, 66A that are fixedly attached to the tray 38 with any suitable means. Thus, as the cam member 56 is rotated, cam followers 62, 62A move axially as they follow the contour of cam surfaces 58, 58A and, accordingly, drive the shaft 64 axially to cause the tray to move longitudinally. As discussed below, the contour of the cam surfaces 58, 58A determine the distance of travel as well as the velocity and acceleration of the tray 38.

Cam followers 68, 68A are attached to a reciprocatable shaft 70 (a second shaft is shown in FIG. 4), and these cam followers track the cam surfaces 60, 60A. Thus, as the cam member is rotated, the shaft 70 is caused to reciprocate. This shaft passes through appropriately-bushed openings in both the enclosure 50 as well as the tray supports 66, 66A. Attached at opposite ends of the shaft 70 are support means for the counterweight means 42. These support means include cross-brace members 72, 72A and upright members 74, 74A, etc. (see FIG. 4). Attached to these upright members is a counterweight 76. A second counterweight 76A is on the opposite side of the tray as shown in FIG. 4. By this construction, the counterweight means 42 is moved in the opposite direction from movement of the tray 38 to offset the reaction force produced by the moving tray. By the choice of the cam surfaces 60, 60A the counterweight means can be moved with the proper distance, acceleration and velocity to negate vibration that would be caused by the movement of the tray 38.

The weight of the two counterweights 76, 76A is chosen to be approximate the weight of the moving tray 38. Furthermore, the shape and position of the counterweights are chosen so that the center of mass of the counterweight means 42 moves along a line of action at the same location as the center of mass of the tray 38. This further assists in negating undesirable vibration.

Figure 5:
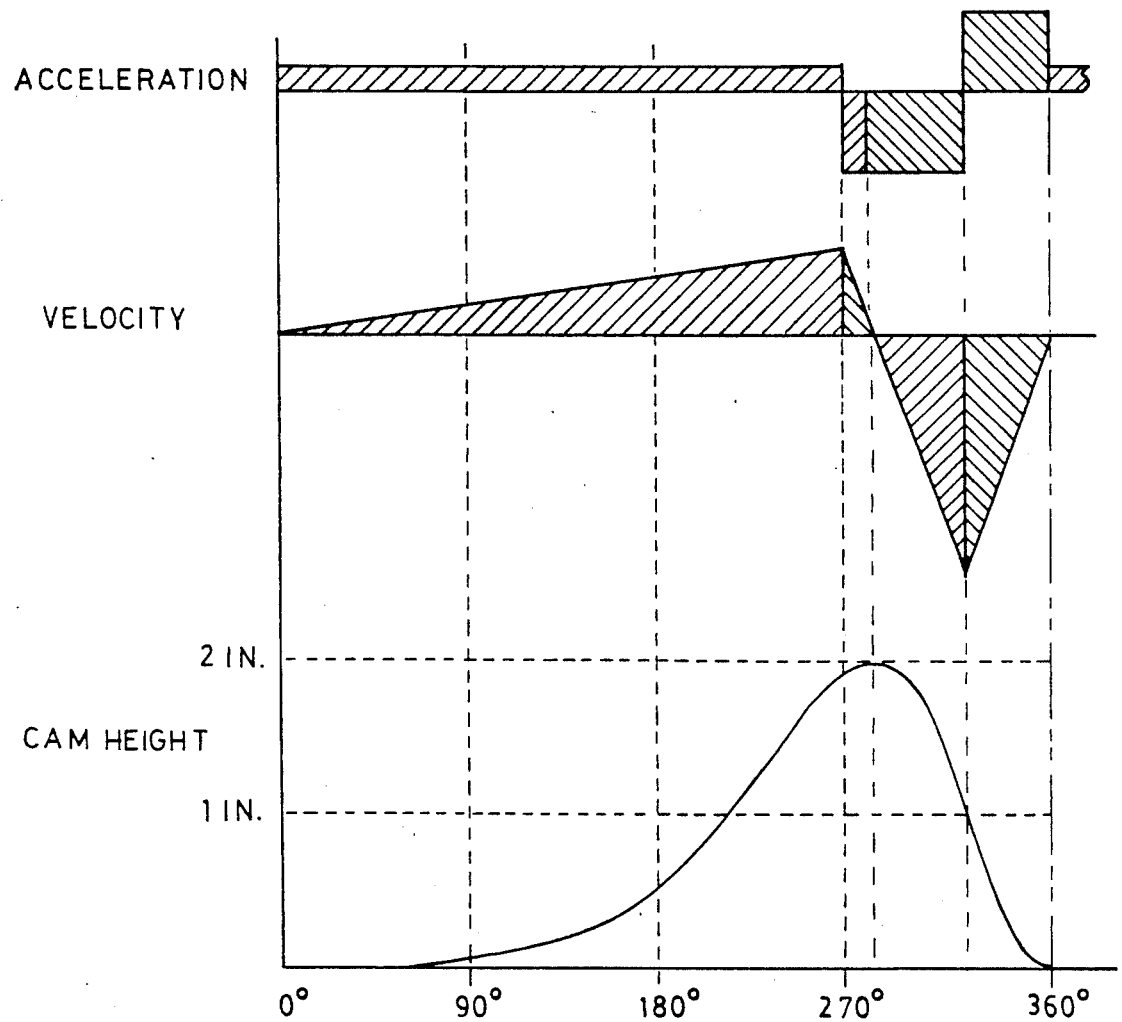
FIG. 5 is series of plots representing acceleration, velocity and cam height as a function of rotation of a cam utilized to produce the inertial motion to articles handled on the conveyor of the present invention.

A typical relationship between acceleration and velocity of a tray, and thus articles supported on the tray, is depicted in FIG. 5 as a function of the contour of the cam member during a complete rotation thereof. This is depicted for a cam member providing a two inch stroke of the tray. In this embodiment, the cam member initially (in a given revolution of the cam member) provides a constantly increasing velocity that results in a constant acceleration. In this particular illustration, this is for the "forward" stroke of the tray over about 270 degrees of rotation. The acceleration is chosen such that the frictional contact (due to the coefficient of friction of the product and of the pan) between articles on the tray and the surface of the tray is not overcome. If necessary, this coefficient of friction can be determined by measuring the angle of repose which is the maximum angle at which the product will stay in place. Typical values are thirty-one degrees for a coefficient of friction of 0.6 to eleven-plus degrees for a coefficient of friction of 0.2.

As illustrated in FIG. 5, as the 270 degree of the cam member is approached, the velocity is rapidly decreased resulting in a sudden change in acceleration to a negative acceleration. This causes the frictional contact between the articles and the tray to be broken whereby the articles then continue to move across the surface of the tray as the tray comes to a stop in one direction and then is reversed in direction. This reversal occurs over a period of about 90 degrees of rotation. For about one-half of this reversal, the nearly linear increase of velocity in the opposite direction produces the nearly constant acceleration in that reverse direction with this acceleration being sufficient to overcome frictional forces between the articles and the tray. Finally, as the velocity returns rapidly to the zero point, the acceleration again changes direction and is a rather constant but large value. At that point the cam member has completed one full revolution and is started on the next revolution.

In this FIG. 5 the general contour of a cam member is depicted for a two-inch stroke. In order to prevent a too severe angle of attack of cam followers on a cam having a two-inch stroke, the cam member typically has a 12-inch diameter. When only a one-inch stroke is required, this diameter can be about 9 inches. It will be understood, however, that other stroke values can be used as well as other divisions of forward and reverse directions during each revolution of the cam member. Generally, the forward stroke is about 200 to about 280 degrees of a revolution. Also, the cam surfaces can be altered to provide substantially constant velocity during the forward stroke as long as the resultant ever-increasing acceleration on the forward stroke does not exceed the value necessary to break the frictional contact between the articles and the conveyor tray surface and the acceleration on the return stroke is greater than this value.

Furthermore, it will be understood that the cam member can be periodically rotated in an opposite direction such that articles supported on the conveyor tray can be moved in the opposite direction. This feature might be utilized to move articles first in one direction for a time duration until, for example, a bin at a receiving end of the conveyor is full. Articles can then be moved in the opposite direction to fill another bin, for example.

It can be shown that, for a two inch stroke, divided as a time cycle of 270 degrees forward stroke and 90 degrees return stroke, that the optimum RPM varies from about 300 RPM for a coefficient of friction of 0.6 to about 190 RPM for a coefficient of friction of 0.2. The optimum throughput of a two inch stroke is approximately 1.414 times the optimum throughput of a one inch stroke. The product throughput at the optimum RPM is approximately 1.5 times the stroke. Thus for a two inch stroke at 300 RPM, the throughput can be shown to be approximately 75 ft/min.

The optimum RPM of a two inch stroke is about 0.707 times the optimum RPM of a one inch stroke. The minimum operable RPM is approximately 0.25 times the optimum RPM.

The forces on the return stroke of the tray of the conveyor are about 17 times the forces on the forward stroke. These forces are independent of the length of the stroke if the same cam attack angle is provided. Thus, with a typical 75 pound mass tray system and a two inch stroke at 300 RPM, about 277 ft.lb. of torque are required at the maximum torque point of the return stroke on a twelve inch diameter cam member. With a typical gear ratio of 6:1, a 1800 RPM motor would require a short interval surge of about 15.4 horsepower, five times each second. Substantial inertia should be designed into the rotating system so that the torque is averaged out, but a two to three horsepower motor requirement should be expected.

If the stroke is divided as 225 degrees forward and 135 degrees return (as determined by the cam surfaces), the forces on the return stroke are reduced to 4.5 times the forces on the forward stroke. This substantially reduces the horsepower requirement. However, the minimum operable RPM is then ½ the optimum operable RPM thus making the speed more critical for different values of coefficient of friction. In addition, the optimum RPM is only 0.77 of that of the 270/90 degree stroke and the throughput per stroke is closer to 1.0 making the throughput per unit time only ½ of the 270/90 degree stroke.

A conveyor system embodying the principles of having a counter weight mechanism of substantially the same mass as the tray mechanism, the two mechanisms having a common line of action for their individual centers of equal mass, has been constructed using a two inch stroke. This unit has demonstrated that substantially all detrimental vibration has been eliminated during the conveying of articles thereon.

From the foregoing, it will be understood by persons skilled in the art that an improved inertial-type conveyor system is provided. This conveyor system demonstrates reduced detrimental vibration as compared to other known conveyor systems. Although the device has been described as having some components that perform a dual function in the motion of the conveyor tray member and the counterweight means, it will be understood that the drive mechanisms can be entirely separate. Certain specific information is provided herein as to operating conditions; however, these conditions are given for illustration purposes and not for limitation of the present invention. Rather, the invention is to be limited only by the appended claims and their equivalents when considered with a complete disclosure of the invention.

I claim:

1. An inertial-type conveyor system for the moving of articles therewith, said conveyor system having reduced detrimental vibration, said conveyor system comprising:

a frame member;

a conveyor tray mechanism, including a tray member for support and movement of said articles, mounted on said frame member, said tray member adapted for longitudinal movement relative to said frame member;

means for moving said tray member in a forward longitudinal stroke of a first selected distance relative to said frame member at an acceleration less than that at which frictional contact between said articles and said tray member is overcome for a first selected time period whereby said articles move with said tray member, and for moving said tray member in an opposite return longitudinal stroke of said first selected distance relative to said frame member at an acceleration greater than that at which said frictional contact is overcome for a second selected time period whereby said articles continue to move on said tray member by inertia while said tray member moves in said opposite direction; and means associated with said frame member for offsetting reaction forces produced by movement of said tray member during said forward and return strokes.

2. The conveyor system of claim 1 wherein said means for offsetting said reaction forces comprises:

a counterweight means including counterweights of substantially equal mass disposed adjacent each of opposite side edges of said tray member, said counterweight means adapted for longitudinal movement relative to said frame member; and means for longitudinally moving said counterweight means, during movement of said tray member, in a first direction and distance, acceleration and velocity relative to said frame member, said first direction being opposite to said forward stroke of said tray member during said first selected time period, and in a second direction and distance, acceleration and velocity relative to said frame member, said second direction being opposite to said return stroke of said tray member during said second selected time period.

3. The conveyor system of claim 2 wherein said conveyor tray mechanism and said counterweight means have substantially equal masses and have centers of mass that move along a common line of action during said longitudinal moving of said conveyor tray mechanism and said counterweight means.

4. An intertial-type conveyor system for the moving of articles therewith, said conveyor system having reduced detrimental vibration, said conveyor system comprising:

a frame member;

a conveyor tray mechanism, including a tray member having opposite side edges for support and movement of said articles, mounted on said frame member, said tray member adapted for longitudinal movement relative to said frame member;

a counterweight means including counterweights of substantially equal mass disposed adjacent each of said opposite side edges of said tray member, said counterweight means adapted for longitudinal movement relative to said frame member;

means for moving said tray member in a forward longitudinal stroke of a first selected distance relative to said frame member at an acceleration less than that at which frictional contact between said articles and said tray member is overcome for a first selected time period whereby said articles move in a forward direction on said tray member, and for moving said tray member in an opposite return stroke of said first selected distance relative to said frame member at an acceleration greater than that at which said frictional contact is overcome for a second selected time period whereby said articles continue to move on said tray member in said forward direction by inertial while said tray member moves in said opposite direction; and means for longitudinally moving said counterweight means, during movement of said tray member, in a first direction and distance, acceleration and velocity relative to said frame member, said first direction being opposite to said forward stroke of said tray member during said first selected time period, and in a second direction, acceleration and velocity and distance relative to said frame member, said second direction being opposite to said return stroke of said tray member during said second selected time period.

5. The conveyor system of claim 4 wherein said conveyor tray mechanism and said counterweight means having substantially equal masses and centers of mass that move along a common line of action during said longitudinal moving of said conveyor tray mechanism and said counterweight means.

6. The conveyor system of claim 4 wherein said means for moving said tray member in opposite directions comprises:

a first cam member for said conveyor tray mechanism adapted for rotation around an axis substantially parallel to said direction of moving of said tray member, said first cam member provided with a cam surface of a selected configuration according to said first and second time periods and said selected distance;

first cam follower means in contact with said cam surface of said first cam member, said first cam follower means attached to said tray member whereby movement of said first cam follower means by said first cam surface results in said forward and return strokes of said tray member relative to said frame member; and drive means for continuously rotating said first cam member in a selected direction.

7. The conveyor system of claim 6 wherein said means for longitudinally moving said counterweight means in opposite directions comprises:

a second cam member adapted for rotation around an axis substantially parallel to said direction of motion of said tray member, said second cam member provided with a cam surface of a selected configuration according to said first and second time periods and distances;

second cam follower means in contact with said cam surface of said second cam member, said second cam follower means attached to said counterweight means whereby movement of said second cam follower means by said cam surface of said second cam member results in said longitudinal movement of said counterweight means relative to said frame member; and drive means for continuously rotating said second cam member in a selected direction.

8. The conveyor system of claim 7 wherein said second cam member is a common cam member of said first cam member, said common cam member provided with said cam surfaces for moving said tray member and for moving said counterweight means, and said drive means for said first cam member being said drive means for said second cam member.

9. The conveyor system of claim 6 wherein said forward stroke of said tray member has a time duration substantially longer than said return stroke.

10. The conveyor system of claim 9 wherein said forward stroke of said tray member occurs during about 220 to about 280 degrees of rotation of said first cam member, with said return stroke occurring during the remainder of a revolution of said first cam member.

11. An inertial-type conveyor system for the moving of articles therewith, said conveyor system having reduced detrimental vibration, said conveyor system comprising:

a frame member;

a conveyor tray mechanism, including a tray member for support and movement of said articles, mounted on said frame member, said tray member adapted for longitudinal movement during a forward stroke of a selected distance and a return stroke of an equal distance relative to said frame member;

a counterweight means, including counterweights, mounted on said frame, said counterweight means adapted for longitudinal movement relative to said frame member;

means for moving said tray member during said forward stroke at an acceleration less than that at which frictional contact between said articles and said tray member is overcome during said forward stroke whereby said articles move in a forward direction on said tray member, and for moving said tray member in said return stroke at an acceleration greater than that at which said frictional contact is overcome during said return stroke whereby said articles continue to move on said tray member in said forward direction by inertia while said tray member moves in said return stroke; and means for moving said counterweight means, during movement of said tray member, in a first direction and distance, acceleration and velocity relative to said frame member, said tray member, and in a second direction and distance, acceleration and velocity relative to said frame member, said second direction being opposite to said return stroke of said tray member;

said means for moving said tray member and said counterweight means including a. a cam member adapted for rotation around an axis substantially parallel to said first and second directions of said counterweight means, said cam member being provided with a first cam surface and a second cam surface, said first cam surface having a selected configuration for providing said forward and return strokes of said tray member, and said second cam surface having a selected configuration for providing said movement of said counterweight means, b. a first cam follower means in contact with said first cam surface, said first cam follower means connected to said tray member, c. a second cam follower means in contact with said second cam surface, said second cam follower means connected to said counterweight means, and d. drive means connected to said cam member for rotating said cam member in a selected direction;

said conveyor tray mechanism and said counterweight means having substantially equal masses and centers of mass that move along a common line of action during said longitudinal movement whereby said conveyor system has reduced detrimental vibration.

12. The conveyor system of claim 11 wherein said forward stroke of said tray member has a time duration substantially longer than said return stroke.

13. The conveyor system of claim 12 wherein said forward stroke of said tray member occurs during about 220 to about 280 degrees of rotation of said cam member, with said return stroke occurring during remainder of a revolution of said cam member.

14. The conveyor system of claim 11 wherein said tray member has opposite side edges, and said counterweight means includes counterweights of substantial equal mass disposed adjacent each of said opposite side edges of said tray member.

15. The conveyor system of claim 11 wherein said cam member is provided with a pair of uniformly-spaced first cam surfaces and a pair of first cam follower means in contact with each of said first cam surfaces, and further provided with a pair of uniformly-spaced second cam surfaces and a pair of second cam follower means in contact with each of said second cam surfaces.

16. The conveyor system of claim 15 wherein said pair of first cam follower means are attached to a shaft adapted to move in a direction parallel to said tray member, said shaft having opposite ends, said opposite ends attached to said tray member; and wherein said pair of second cam follower means are attached to a second shaft adapted to move in a direction parallel to said counterweight means, said second shaft having opposite ends, said opposite ends attached to said counterweight means.

17. An intertial-type conveyor system for the moving of articles thereby, said conveyor system having reduced detrimental vibration, said conveyor system comprising:

a frame member;

a conveyor tray mechanism, including a tray member for support and movement of said articles, mounted on said frame member, said tray member adapted for longitudinal movement during a forward stroke of a selected distance and a return stroke of an equal distance relative to said frame member;

a counterweight means, including counterweights, mounted on said frame member, said counterweight means adapted for longitudinal movement relative to said frame member;

means for moving said tray member during said forward stroke at an acceleration less than that at which frictional contact between said articles is overcome during said forward stroke whereby articles move in a forward direction on and with said tray member, and for moving said tray member in said return stroke at an acceleration greater than that at which said frictional contact is overcome during said return stroke whereby said articles continue to move on said tray member in said forward direction by inertia while said tray member moves in said return stroke; and means for moving said counterweight means, during movement of said tray member, in a first direction and distance, acceleration and velocity relative to said frame member, said first direction being opposite to said forward stroke of said tray member, and in a second direction and distance, acceleration and velocity relative to said frame member, said second direction being opposite to said return stroke of said tray member;

said means for moving said tray member and said counterweight means including a. a cam member adapted for rotation around an axis substantially parallel with said first and second directions of said counterweight means, said cam member being provided with a pair of uniformly-spaced first cam surfaces and a pair of uniformly-spaced second cam surfaces, said first cam surfaces having a selected configuration for providing said forward and return strokes of said tray member, and said second cam surfaces having a selected configuration for providing said movement of said counterweight means, b. a pair of first cam follower means in contact with said first cam surfaces, said first cam follower means fastened to a first reciprocatable shaft adapted to move parallel to said tray member, said first reciprocatable shaft having opposite ends connected to said tray member, c. a pair of second cam follower means in contact with said second cam surfaces, said second cam follower means fastened to a second reciprocatable shaft adapted to move parallel to said counterweight means, said second reciprocatable shaft having opposite ends connected to said counterweight means, and d. rotatable drive means connected to said cam member for rotating said cam member in a selected direction;

said conveyor tray mechanism and said counterweight means having substantially equal masses and centers of mass that move along a common line of action during said movement of said conveyor tray mechanism and said counterweight means whereby said conveyor system has reduced detrimental vibration.

18. The conveyor system of claim 17 wherein said tray member has opposite side edges, and said counterweight means includes counterweights of substantially equal mass disposed adjacent each of said opposite side edges of said tray member.

19. The conveyor system of claim 17 wherein said forward stroke of said tray member occurs during about 220 to about 280 degrees of rotation of said cam member, with said return stroke occurring during the remainder of a revolution of said cam member.

20. An inertial-type conveyor system for the moving of articles therewith, said conveyor system having reduced detrimental vibration, said conveyor system comprising:

a frame member;

a conveyor tray mechanism, including a tray member for support and movement of said articles, mounted on said frame member, said tray member adapted for longitudinal movement during a forward stroke of a selected distance and a return stroke of an equal distance relative to said frame member;

a counterweight means, including counterweights, mounted on said frame member, said counterweight means adapted for longitudinal movement relative to said frame member;

means for moving said tray member during said forward stroke at an acceleration less than that at which frictional contact between said articles and said tray member is overcome during said forward stroke whereby said articles move in a forward direction on and with said tray member, and for moving said tray member in said return stroke at an acceleration greater than that at which said frictional contact is overcome during said return stroke whereby said articles continue to move on said tray member in said forward direction by inertial while said tray member moves in said return stroke; and means for moving said counterweight means, during movement of said tray member, in a first direction and distance, acceleration and velocity relative to said frame member, said first direction being opposite to said forward stroke of said tray member, and in a second direction and distance, acceleration and velocity relative to said frame member, said second direction being opposite to said return stroke of said tray member;

said means for moving said tray member and said counterweight means including a. a rotatable cam member, said cam member being provided with a first pair of uniformly spaced-apart cam surfaces and a second pair of uniformly spaced-apart cam surfaces, said first pair of cam surfaces having selected configurations for providing said forward and return strokes of said tray member, and said second pair of cam surfaces having selected configurations for providing said movement of said counterweight means, b. a first pair of cam follower means in contact with said first cam surfaces, said first pair of cam follower means connected to a first reciprocatable shaft adapted to move in a direction parallel to said tray member, said first reciprocatable shaft having opposite ends attached to said tray member, c. a second pair of cam follower means in contact with said second cam surfaces, said second pair of cam follower means connected to a second reciprocatable shaft adapted to move in a direction parallel to said counterweight means, said second reciprocatable shaft having opposite ends attached to said counterweight means, and d. drive means connected to said cam member for rotating said cam member in a selected direction;

said conveyor tray mechanism and said counterweight means having substantially equal masses and having centers of mass that move along a common line of action as said tray mechanism and said counterweight means are moved whereby said conveyor system has reduced detrimental vibration.

* * * * *